(12) United States Patent
Du et al.

(10) Patent No.: US 12,055,978 B2
(45) Date of Patent: Aug. 6, 2024

(54) ELECTRONIC DEVICE, CONTROL METHOD THEREOF AND CONTROL APPARATUS THEREOF

(71) Applicant: VIVO MOBILE COMMUNICATION CO., LTD., Guangdong (CN)

(72) Inventors: Xianhe Du, Guangdong (CN); Mingjian Liu, Guangdong (CN); Qiong Chen, Guangdong (CN); Hao Hu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/351,628

(22) Filed: Jul. 13, 2023

(65) Prior Publication Data

US 2023/0359247 A1 Nov. 9, 2023

Related U.S. Application Data

(63) Continuation of application No. PCT/CN2022/070993, filed on Jan. 10, 2022.

(30) Foreign Application Priority Data

Jan. 14, 2021 (CN) .......................... 202110050076.5

(51) Int. Cl.
 *G05B 15/02* (2006.01)
 *G06F 1/16* (2006.01)
(52) U.S. Cl.
 CPC .......... *G06F 1/1652* (2013.01); *G06F 1/1601* (2013.01)
(58) Field of Classification Search
 CPC .......... G06F 3/00; G06F 1/00; G06F 2117/00; G09F 9/301; G09F 15/00; G09F 13/00; G09F 11/00; G09F 9/30; G09F 9/302; G09F 9/33; G09F 9/35; G09F 9/37; G09F 27/00; G09F 25/00; G09F 23/00; G09F 21/00

See application file for complete search history.

(56) References Cited

U.S. PATENT DOCUMENTS

| | | | |
|---|---|---|---|
| 2006/0067672 | A1 | 3/2006 | Washisu et al. |
| 2019/0317550 | A1 | 10/2019 | Kim et al. |
| 2021/0329112 | A1 | 10/2021 | Li |
| 2022/0253106 | A1 | 8/2022 | Du et al. |

(Continued)

FOREIGN PATENT DOCUMENTS

| | | |
|---|---|---|
| CN | 208623755 U | 3/2019 |
| CN | 109756594 A | 5/2019 |
| CN | 110300195 A | 10/2019 |

(Continued)

*Primary Examiner* — Elmito Breval
(74) *Attorney, Agent, or Firm* — Price Heneveld, LLP

(57) ABSTRACT

An electronic device is provided, including a housing, a screen, a deformation drive part, and a camera. The screen and the housing form an inner cavity in which the camera and the deformation drive part are disposed. The deformation drive part drives a second area located at an edge of the screen to switch between a flattened state and a curved state through deformation. When the second area is in the flattened state, the second area is a flat second plane area, and the second plane area is located in the same plane as a first plane area of a first area of the screen. A light-transmitting area is disposed in the second area. In the case that the second area is in the flattened state, ambient light passing through the light-transmitting area is projected onto the camera.

20 Claims, 3 Drawing Sheets

(56) References Cited

U.S. PATENT DOCUMENTS

| | | | |
|---|---|---|---|
| 2022/0261041 A1 | 8/2022 | Du et al. | |
| 2022/0261043 A1 | 8/2022 | Du et al. | |

FOREIGN PATENT DOCUMENTS

| | | | |
|---|---|---|---|
| CN | 110879671 | A | 3/2020 |
| CN | 110928364 | A | 3/2020 |
| CN | 110928365 | A | 3/2020 |
| CN | 110944074 | A | 3/2020 |
| CN | 210129880 | U | 3/2020 |
| CN | 211427203 | U | 9/2020 |
| CN | 112714209 | A | 4/2021 |
| CN | 112887534 | A | 6/2021 |
| JP | 2002236454 | A | 8/2002 |
| JP | 2008131555 | A | 6/2008 |
| WO | 2020009172 | A1 | 1/2020 |

ELECTRONIC DEVICE, CONTROL METHOD THEREOF AND CONTROL APPARATUS THEREOF

CROSS-REFERENCE TO RELATED APPLICATION

This application is a continuation application of PCT International Application No. PCT/CN2022/070993 filed on Jan. 10, 2022, which claims priority to Chinese Patent Application No. 202110050076.5, entitled "ELECTRONIC DEVICE, CONTROL METHOD THEREOF AND CONTROL APPARATUS THEREOF" filed with the Chinese Patent Office on Jan. 14, 2021, which are incorporated by reference in their entireties.

TECHNICAL FIELD

The present disclosure relates to the technical field of communication devices, in particular to an electronic device, a control method thereof and a control apparatus thereof.

BACKGROUND

As electronic devices advance, electronic devices with a high screen-to-body ratio become increasingly popular with consumers. It has been a new trend to improve the screen-to-body ratio of the electronic devices.

In order to increase the screen-to-body ratio while retaining the front camera, there are various design choices, such as "notch" display, "hole" display, pop-up front camera, and under-display camera on the market. However, with respect to the "notch" display or the "hole" display, the screen at where the "notch" or the "hole" is located does not display images, thereby affecting the display effect of the electronic devices to some extent. With respect to the pop-up front camera, although the display area is ensured, it takes a long time for the camera to capture images from popping up. Moreover, with respect to the under-display camera, it considers the display area of the electronic devices and image feedback time, but the screen where the camera is located requires a high light transmittance. This reduces the number of display components at the camera, resulting in a decrease in display image pixels, which affects the display effect.

SUMMARY

According to a first aspect, an embodiment of the present disclosure provides an electronic device, including a housing, a display screen, a deformation drive part, and a camera module. The display screen is disposed on the housing. The display screen and the housing form an inner cavity. The camera module and the deformation drive part are disposed in the inner cavity. The display screen includes a first area and a second area connected to each other. The first area is a first plane area, and the second area is located on an edge of the display screen. The deformation drive part is connected to the second area. The deformation drive part drives the second area to switch between a flattened state and a curved state through deformation. In a case that the second area is in the flattened state, the second area is a flat second plane area, and the second plane area is located in a same plane as the first plane area. In a case that the second area is in the curved state, the second area is curved. A light-transmitting area is disposed in the second area. In the case that the second area is in the flattened state, ambient light passing through the light-transmitting area is projected onto the camera module.

According to a second aspect, an embodiment of the present disclosure provides a control method of an electronic device, where the electronic device is the electronic device according to the first aspect. The control method includes: receiving an input; in a case that the input is a first input, controlling the deformation drive part to drive the second area to be in the flattened state, and controlling the camera module to shoot; and in a case that the input is a second input, controlling the deformation drive part to drive the second area to be in the curved state.

According to a third aspect, an embodiment of the present disclosure provides a control apparatus of an electronic device, where the electronic device is the electronic device according to the first aspect. The control apparatus includes: a receiving module, configured to receive an input; a first control module, configured to, in a case that the input is a first input, control the deformation drive part to drive the second area to be in the flattened state, and control the camera module to shoot; and a second control module, configured to, in a case that the input is a second input, control the deformation drive part to drive the second area to be in the curved state.

According to a fourth aspect, an embodiment of the present disclosure provides a terminal device, including a processor, a memory, and a program or instructions stored on the memory and executable on the processor, the program or the instructions, when executed by the processor, implementing the steps of the control method according to the second aspect.

According to a fifth aspect, an embodiment of the present disclosure provides a readable storage medium, storing a program or instructions, the program or the instructions, when executed by a processor, implementing the steps of the control method according to the second aspect.

According to a sixth aspect, an embodiment of the present disclosure provides a computer program product, stored in a non-volatile storage medium, the program product being configured to be executed by at least one processor to implement the steps of the control method according to the second aspect.

According to a seventh aspect, an embodiment of the present disclosure provides a chip, including a processor and a communication interface, the communication interface being coupled to the processor, and the processor being configured to run a program or instructions to implement the control method according to the second aspect.

BRIEF DESCRIPTION OF THE DRAWINGS

The accompanying drawings described herein are used to provide a further understanding of the present disclosure, and form part of the present disclosure. Exemplary embodiments of the present disclosure and descriptions thereof are used to explain the present disclosure, and do not constitute any inappropriate limitation to the present disclosure. In the accompanying drawings.

REFERENCE NUMERALS

Figure 1:
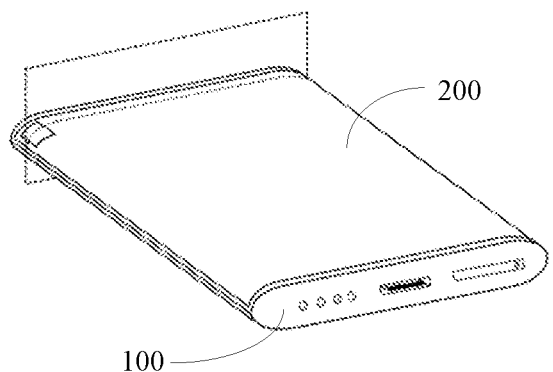
FIG. 1 is a schematic structural diagram of an electronic device according to an embodiment of the present disclosure.
Figure 2:
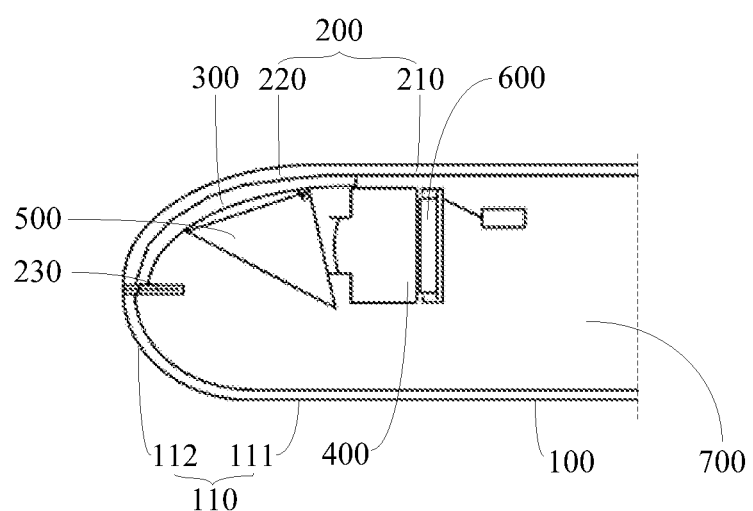
FIG. 2 is a partial section view of an electronic device according to an embodiment of the present disclosure.
Figure 3:
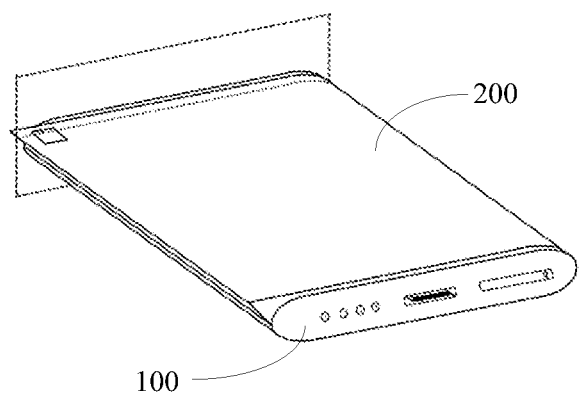
FIG. 3 is a schematic structural diagram showing that a second area of an electronic device according to an embodiment of the present disclosure is in a flattened state.
Figure 4:
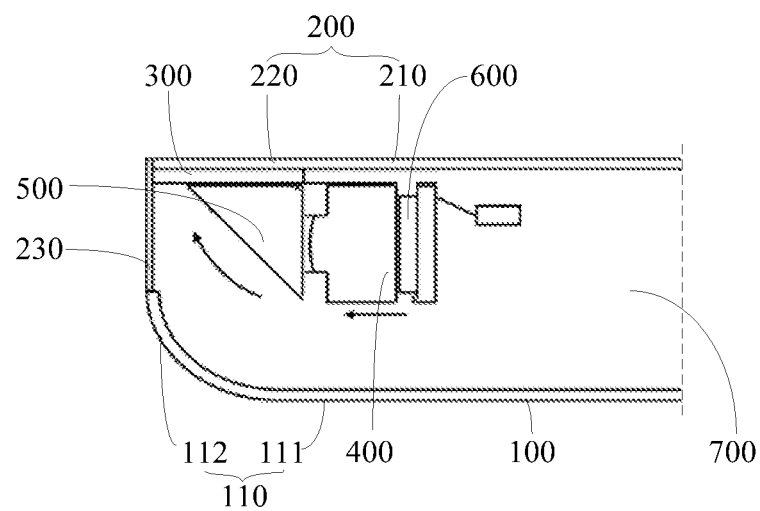
FIG. 4 is a partial section view showing that a second area of an electronic device according to an embodiment of the present disclosure is in a flattened state.
Figure 5:
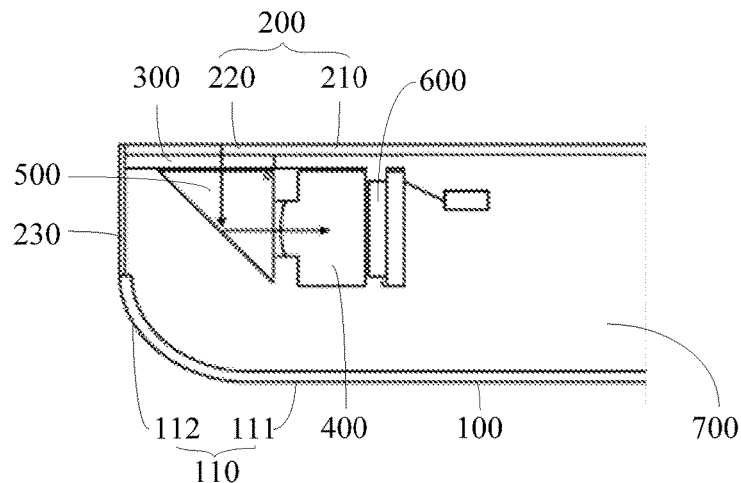
FIG. 5 is a schematic diagram of ambient light projection of an electronic device according to an embodiment of the present disclosure.

100—housing, 110—back cover, 111—flat part, 112—curved part;
200—display screen, 210—first area, 220—second area, 230—folding mechanism;
300—deformation drive part;
400—camera module;
500—reflection component;
600—drive mechanism;
700—inner cavity;
1200—electronic device, 1201—radio frequency unit, 1202—network module, 1203—audio output unit, 1204—input unit, 12041—graphics processing unit, 12042—microphone, 1205—sensor, 1206—display unit, 12061—display panel, 1207—user input unit, 12071—touch panel, 12072—other input devices, 1208—interface unit, 1209—memory, 1210—processor, 1211—power supply.

DETAILED DESCRIPTION

To clearly states the objectives, technical solutions, and advantages of the present disclosure, the technical solutions of the present disclosure will be clearly described below with reference to specific embodiments of the present disclosure and the accompanying drawings. Apparently, the described embodiments are only some embodiments rather than all the embodiments of the present disclosure. All other embodiments obtained by a person of ordinary skill in the art based on the embodiments of the present disclosure without creative efforts shall fall within the protection scope of the present disclosure.

The following describes the technical solution provided in each embodiment of the present disclosure in detail with reference to the accompanying drawings.

As shown in FIG. 1 to FIG. 5, the embodiments of the present disclosure provide an electronic device, including a housing 100, a display screen 200, a deformation drive part 300, and a camera module 400.

The housing 100 is a basic component of the electronic device. The housing 100 can provide foundation for mounting other components of the electronic device. The display screen 200 is disposed on the housing 100, and forms an inner cavity 700 with the housing 100. The inner cavity 700 is a mounting space that can receive other components of the electronic device. The camera module 400 and the deformation drive part 300 are both disposed in the inner cavity 700. In addition, the inner cavity 700 can provide protection for other components (such as a motherboard, a battery, and the like) of the electronic device.

The display screen 200 includes a first area 210 and a second area 220 that are connected to each other. The first area 210 is a first plane area, that is, a display surface of the first plane area is flat. The second area 220 is located on the edge of the display screen 200. The deformation drive part 300 is connected to the second area 220. The deformation drive part 300 drives the second area 220 to switch between a flattened state and a curved state through deformation. Specifically, in the case that the electronic device is in a shooting mode, the deformation drive part 300 drives the second area 220 to be in the flattened state through deformation. In the case that the electronic device is in a daily working mode (namely, a non-shooting mode), the deformation drive part 300 drives the second area 220 to be in the curved state through deformation. In this case, the display screen 200 forms a curved screen, for example, a waterfall screen. In an optional solution, the first area 210 and the second area 220 are an integrated structure. Certainly, the first area 210 and the second area 220 may be separate structures, and the two may be assembled and connected by means of bonding.

In the case of the flattened state, the second area 220 is a flat second plane area, and the second plane area is located in the same plane as the first plane area. That is, in the case that the second area 220 is in the flattened state, the second plane area and the first plane area can be used for display simultaneously, thereby enabling content display in a larger area. In the case that the second area 220 is in the curved state, the second area 220 is curved. That is, in the case that the second area 220 is in the curved state, the first plane area is responsible for display, while the second area 220 in the curved state cannot form an effective display for a user. A light-transmitting area is disposed in the second area 220. In the case that the second area 220 is in the flattened state, ambient light passing through the light-transmitting area is projected onto the camera module 400. Specifically, when the camera module 400 is working, the second area 220 is in the flattened state, and the ambient light is projected onto the camera module 400 through the light-transmitting area.

During a specific working process, when the electronic device is in the shooting mode, the second area 220 gradually changes from the curved state to the flattened state driven by the deformation drive part 300. The ambient light is projected onto the camera module 400 through the light-transmitting area, and the camera module 400 starts working. When the electronic device is in the daily working mode (namely, the non-shooting mode), the second area 220 gradually changes from the flattened state to the curved state driven by the deformation drive part 300, and the camera module 400 is disabled.

The electronic device provided by the embodiments of the present disclosure improves the structure of the display screen 200 of the electronic device in the related art. According to the present electronic device, the display screen 200 includes the first area 210 and the second area 220 connected to each other. The second area 220 can be deformed, and the deformation drive part 300 is connected to the second area 220. In this way, when the electronic device is in the shooting mode, the second area 220 can gradually change from the curved state to the flattened state driven by the deformation drive part 300, and the ambient light is projected onto the camera module 400 through the light-transmitting area, to allow the camera module 400 to start working. When the camera module 400 finishes working and the electronic device is in the daily working mode (namely, the non-shooting mode), the deformation drive part 300 drives the second area 220 to gradually change to the curved state from the flattened state, and the camera module 400 is hidden on the side of the electronic device, which avoids disposing the light-transmitting area on the front side (namely, the first area 210) of the display screen 200 facing the user, thereby increasing the effective display area of the electronic device. Therefore, the electronic device provided by the embodiments of the present disclosure can effectively increase the display area of the electronic device, thereby enhancing the display effect of the electronic device.

As mentioned above, in the case that the second area 220 is in the flattened state, the ambient light passing through the light-transmitting area is projected onto the camera module 400. Specifically, the camera module 400 may face the light-transmitting area, so that the ambient light passing through the light-transmitting area can directly enter the camera module 400, thereby enabling the camera module 400 to shoot.

In another alternative solution, in the embodiments of the present disclosure, the orientation of the light-transmitting area may intersect with the orientation of the camera module 400, and a reflection component 500 is disposed between the light-transmitting area and the camera module 400, so that the ambient light passing through the light-transmitting area is reflected to the camera module 400 by the reflection component 500. When the camera module 400 is in the working state, the ambient light is first projected from outside through the light-transmitting area onto the reflection component 500, and then reflected onto the camera module 400 by the reflection component 500. By changing the position of the camera module 400, the camera module 400 is prevented from being disposed within the area covered by the second area 220, which is beneficial for the curving deformation of the second area 220. In addition, since the reflection component 500 can adjust the optical path, the camera module 400 can be laterally disposed in the inner cavity 700, which effectively reduces the thickness of the electronic device, thereby making the electronic device thinner and lighter. Certainly, the camera module 400 has a small size in the thickness direction of the electronic device, which helps to reduce the thickness of the electronic device. It should be noted that, the camera module 400 being laterally disposed refers to that the orientation of the camera module 400 is perpendicular to the orientation of the first area 210, and the thickness direction of the electronic device refers to a size of the electronic device in a direction perpendicular to the first area 210.

In the embodiments of the present disclosure, the reflection component 500 may be disposed in the inner cavity 700 in advance, so that the light passing through the second area 220 in the flattened state can be just reflected onto the camera module 400 by the reflection component 500 disposed at a preset position. Specifically, the reflection component 500 may be fixed (for example, by adhesive bonding) in the inner cavity 700.

In another optional solution, the reflection component 500 is connected to the deformation drive part 300. The deformation drive part 300 drives the reflection component 500 to move to a working position, and the ambient light passing through the light-transmitting area is reflected onto the camera module 400 by the reflection component 500 at the working position. In this case, the deformation drive part 300 can adjust the position of the reflection component 500 while driving the deformation of the second area 220. Obviously, the position of the reflection component 500 can be adjusted according to the deformation of the deformation drive part 300. In the case that the deformation drive part 300 drives the second area 220 to be in the curved state, it is easier to place the reflection component 500 in a relatively tight space inside the curved second area 220. This can fully utilize the relatively tight space in the inner cavity 700 for layout, thereby improving the space utilization, and enabling the electronic device to be more compact.

In addition, since the deformation drive part 300 can drive the reflection component 500 to move, there is no need to provide a special drive device for the reflection component 500, which effectively reduces the number of internal components used in the electronic device, thereby reducing the weight and lowering the cost of the electronic device.

In a further technical solution, the reflection component 500 is rotatably disposed on the inner side of the second area 220, and the electronic device further includes a drive mechanism 600. The drive mechanism 600 is disposed on the side of the camera module 400 facing away from the reflection component 500. The drive mechanism 600 drives the camera module 400, to push the reflection component 500 to rotate, so that an incident surface of light of the reflection component 500 is closely attached to the inner side of the second area 220 in the flattened state. In the case that the electronic device is in the shooting mode, the driving mechanism 600 drives the camera module 400 to push the reflection component 500 to rotate, so that the incident surface of light of the reflection component 500 is closely attached to the inner side of the second area 220 in the flattened state. This provides a certain support for the flattened second area 220, thereby allowing the second area 220 to be flatter. Further, this can avoid adverse effects on shooting caused by a low flatness of the second area 220, and can correct an incident direction of the ambient light, thereby realizing optical image stabilization. The drive mechanism 600 may be a hydraulic telescopic component, a pneumatic telescopic component, a piezoelectric structural component, a shape-memory alloy structure, or the like. The embodiments of the present disclosure do not limit the specific type of the drive mechanism 600.

In another specific embodiment, the reflection component 500 is rotatably disposed on the inner side of the second area 220, and the electronic device further includes a drive apparatus, which is connected to the reflection component 500. The drive apparatus drives the reflection component 500 to rotate, so that an incident surface of light of the reflection component 500 corresponds to the second area 220 in the flattened state. The drive apparatus is specifically disposed for the reflection component 500, which is conducive to separate control of the reflection component 500, and can avoid influences of other components. Similarly, the drive apparatus may be a drive motor, a hydraulic motor, or the like. The embodiments of the present disclosure do not limit the specific type of the drive apparatus.

In the embodiments of the present disclosure, the reflection component 500 may be a plane mirror or a reflection mechanism with other irregular structures (for example, a triangular prism described below), as long as it can reflect the ambient light passing through the second area 220 in the flattened state onto the camera module 400. The embodiments of the present disclosure do not limit the specific type of the reflection component 500.

In an optional solution, the reflection component 500 is a triangular prism. The right-angle part of the triangular prism is rotatably connected to the second area 220 or the deformation drive part 300, which is beneficial for the deformation drive part 300 to adjust the position of the triangular prism. In the flattened state, a first right-angle surface of the triangular prism faces the inner side of the second area 220, and a second right-angle surface of the triangular prism faces the camera module 400. The structure of the triangular prism is more conducive to supporting the second area 220, thereby allowing the flattened second area 220 to be flatter.

In a further solution, in the flattened state, the inner surface of the first area 210 is parallel to the first plane area, and the camera module 400 is slidably disposed on the inner surface of the first area 210. The inner surface of the first area 210 is parallel to the first plane area, which can have a guiding effect on the movement of the camera module 400, thereby facilitating the precise movement of the camera module 400.

As mentioned above, the display screen 200 is disposed on the housing 100, and the second area 220 is located on the edge of the display screen 200. During the process in which the second area 220 is switched between the flattened state and the curved state, there is a position change of the second area 220 relative to the housing 100, producing a gap at the connection between the second area 220 and the housing 100. Therefore, it is needed to keep dust and water out of the gap. In an optional solution, the electronic device further includes a folding mechanism 230, which is connected in a sealed manner between the second area 220 and the housing 100. In the case that the second area 220 is in the flattened state, the folding mechanism 230 is in an unfolded state; and in the case that the second area 220 is in the curved state, the folding mechanism 230 is in a folded state, and a part of the folding mechanism 230 is located inside the inner cavity 700. The folding mechanism 230 can block the gap caused by the second area 220 changing from the curved state to the flattened state. In addition, due to the sealing connection between the second area 220 and the housing 100, in the case that the second area 220 is in the flattened state, the folding mechanism 230 has dust-proof and water-proof effects, and also it can improve the appearance performance of the electronic device. The folding mechanism 230 may be made of a material with high fatigue resistance (such as rubber), so that it is not easily damaged after multiple switches between the folded state and the unfolded state.

In order to avoid the gap caused by the second area 220 changing from the curved state to the flattened state, in another optional solution, the electronic device further includes an elastic connection mechanism, which may replace the foregoing folding mechanism 230. The elastic connection mechanism is made of a stretchable material, such as silicone, rubber, or the like. The elastic connection mechanism is connected in a sealed manner between the second area 220 and the housing 100. The elastic connection mechanism is in an extended state in the case that the second area 220 is in the flattened state, and the elastic connection mechanism is in a retracted state in the case that the second area 220 is in the curved state. The elastic connection mechanism can block the gap caused by the second area 220 changing from the curved state to the flattened state. In addition, due to the sealing connection between the second area 220 and the housing 100, in the case that the second area 220 is in the flattened state, the elastic connection mechanism has dust-proof and water-proof effects on the electronic device. In addition, the elastic connection mechanism realizes deformation through a change in its own length, so it does not occupy a large space.

In the embodiments of the present disclosure, the housing 100 may include a back cover 110. The back cover 110 may include a flat part 111 and a curved part 112. The curved part 112 is connected to the flat part 111, which makes the curve of the back cover 110 of the electronic device smoother, thereby improving the appearance. In the case that the second area 220 is in the curved state, the curved part 112 may be jointed with the second area 220, and tangents at the joint between the curved part 112 and the second area 220 are collinear. In the case that the second area 220 is in the curved state, the curved part 112 of the back cover 110 and the second area 220 are jointed on the same plane and in the same arc, which allows the side edge of the entire electronic device to be smoother. This makes it easier for a user to hold the electronic device during use, thereby effectively enhancing user experience.

In further technical solutions, both the first area 210 and the second area 220 are display areas, and a light transmittance of the second area 220 is greater than that of the first area 210. Both the first area 210 and the second area 220 can achieve the display function of the display screen 200. However, the second area 220 has a higher light transmittance, so the ambient light can be projected onto the camera module 400 through the light-transmitting area of the second area 220, thereby further facilitating shooting while displaying.

Based on the electronic device provided by the embodiments of the present disclosure, the embodiments of the present disclosure provide a control method of an electronic device, which is applicable to the foregoing electronic device. The control method includes:

Step 101. Receive an input.

Step 102. In the case that the input is a first input, control the deformation drive part 300 to drive the second area 220 to be in the flattened state, and control the camera module 400 to shoot.

In this step, the first input may be set to be a shooting mode instruction. In the case that the input is the first input, the deformation drive part 300 drives the second area 220 to change gradually from the curved state to the flattened state. The ambient light is projected onto the camera module 400 through the light-transmitting area of the second area 220, realizing the shooting function.

Step 103. In the case that the input is a second input, control the deformation drive part 300 to drive the second area 220 to be in the curved state.

In this step, the second input may be set to be a daily working mode (namely, the non-shooting mode) instruction. In the case that the input is the second input, the deformation drive part 300 drives the second area 220 to gradually change from the flattened state to the curved state.

Based on the electronic device provided by the embodiments of the present disclosure, the embodiments of the present disclosure provide a control apparatus of the electronic device, which includes a receiving module, a first control module, and a second control module.

The receiving module is configured to receive an input.

The first control module is configured to, in the case that the input is a first input, control the deformation drive part 300 to drive the second area 220 to be in the flattened state, and control the camera module 400 to shoot.

During a specific working process, the first control module controls the deformation drive part 300, to drive the second area 220 to change gradually from the curved state to the flattened state by the deformation drive part 300. The ambient light is projected onto the camera module 400 through the light-transmitting area of the second area 220, realizing the shooting function.

The second control module is configured to, in the case that the input is a second input, control the deformation drive part 300 to drive the second area 220 to be in the curved state.

During a specific working process, the second control module controls the deformation drive part 300, to drive the second area 220 to gradually change from the flattened state to the curved state by the deformation drive part 300.

The electronic device provided by the embodiments of the present disclosure may be a mobile phone, a tablet computer, an e-book reader, a game console, a wearable device, or the like. The embodiments of the present disclosure do not limit the specific type of the electronic device.

Figure 6:
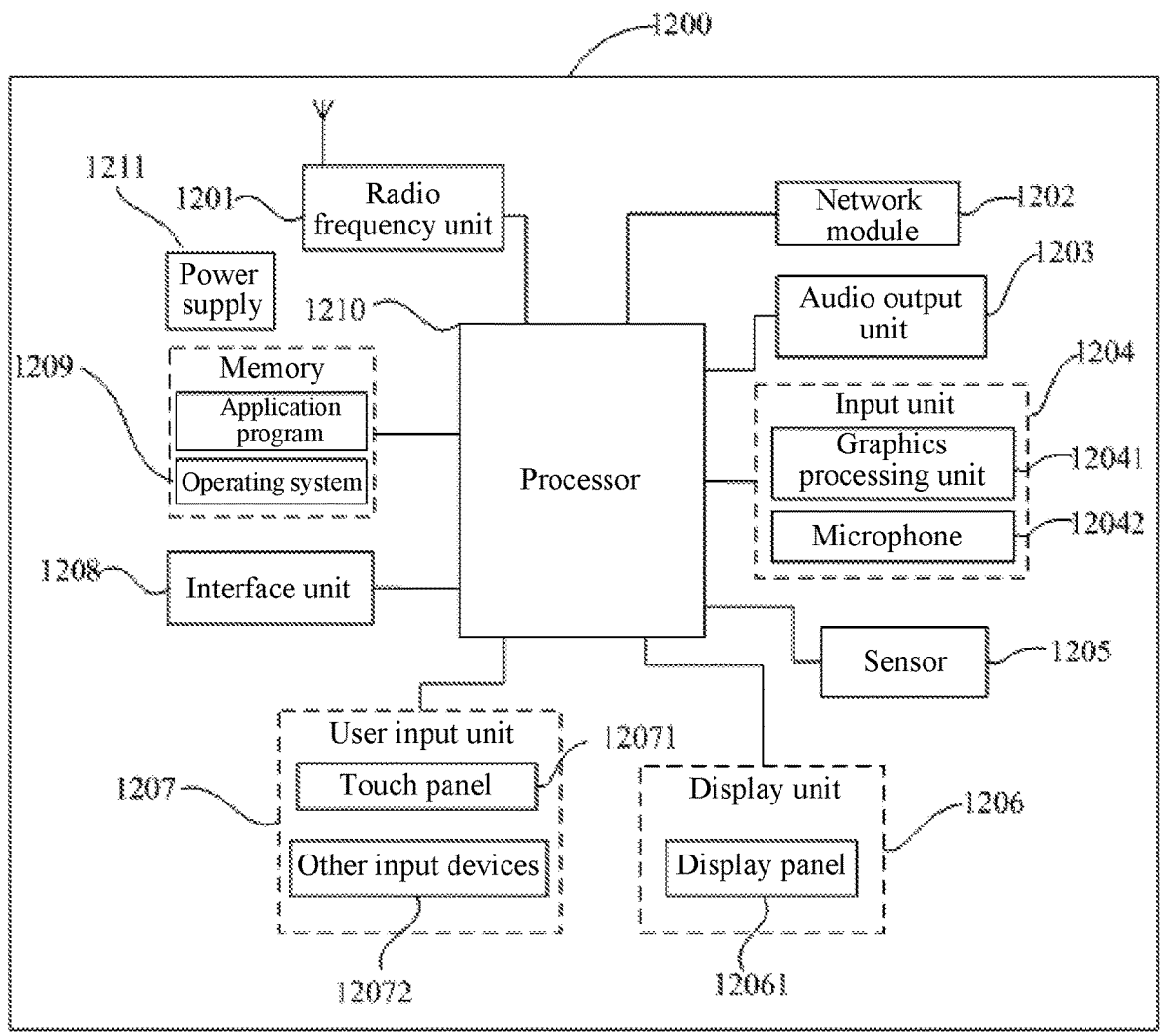
FIG. 6 is a schematic diagram of a hardware structure of an electronic device according to an embodiment of the present disclosure.

FIG. 6 is a schematic diagram of a hardware structure of an electronic device for implementing each embodiment of the present disclosure.

The electronic device 1200 includes but is not limited to: components such as a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. A person skilled in the art may understand that the structure of the electronic device 1200 shown in FIG. 6 constitutes no limitation on the electronic device, and the electronic device may include more or fewer components than those shown in the figure, or some components may be combined, or a different component deployment may be used. In the embodiments of the present disclosure, the electronic device includes, but is not limited to, a mobile phone, a tablet computer, a notebook computer, a palm computer, an in-vehicle terminal, a wearable device, and a pedometer.

The processor 1210 is configured to receive an input from the user input unit 1207, in the case that the input is the first input, control the deformation drive part 300 to drive the second area 220 to be in the flattened state, and control the camera module 400 to shoot; and in the case that the input is the second input, control the deformation drive part 300 to drive the second area 220 to be in the curved state.

The electronic device provided by the embodiments of the present disclosure improves the structure of the display screen 200 of the electronic device in the related art. According to the present electronic device, the display screen 200 includes the first area 210 and the second area 220 connected to each other. The second area 220 can be deformed, and the deformation drive part 300 is connected to the second area 220. In this way, when the electronic device is in the shooting mode, the second area 220 can gradually change from the curved state to the flattened state driven by the deformation drive part 300, and the ambient light is projected onto the camera module 400 through the light-transmitting area, to allow the camera module 400 to start working. When the camera module 400 finishes working and the electronic device is in the daily working mode (namely, the non-shooting mode), the deformation drive part 300 drives the second area 220 to gradually change to the curved state from the flattened state, and the camera module 400 is hidden on the side of the electronic device, which avoids disposing the light-transmitting area on the front side (namely, the first area 210) of the display screen 200 facing a user, thereby increasing the effective display area of the electronic device. Therefore, the electronic device provided by the embodiments of the present disclosure can effectively increase the display area of the electronic device, thereby enhancing the display effect of the electronic device.

It should be understood that in the embodiments of the present disclosure, the radio frequency unit 1201 may be configured to send and receive a signal during an information receiving and sending process or a call process. Specifically, after downlink data from a base station is received, the downlink data is sent to the processor 1210 for processing. In addition, uplink data is sent to the base station. Generally, the radio frequency unit 1201 includes, but is not limited to, an antenna, at least one amplifier, a transceiver, a coupler, a low noise amplifier, a duplexer, and the like. In addition, the radio frequency unit 1201 may further communicate with another device through a wireless communication system.

The electronic device provides wireless broadband Internet access to a user by using the network module 1202, for example, helps the user to send and receive an email, browse a web-page, and access stream media, and the like.

The audio output unit 1203 may convert audio data received by the radio frequency unit 1201 or the network module 1202 or stored in the memory 1209 into an audio signal and output the audio signal as sound. Moreover, the audio output unit 1203 may provide an audio output (such as call signal receiving sound or message receiving sound) related to a specific function executed by the electronic device 1200. The audio output unit 1203 includes a loudspeaker, a buzzer, a receiver, and the like.

The input unit 1204 is configured to receive an audio signal or a video signal. The input unit 1204 may include a graphics processing unit (GPU) 12041 and a microphone 12042. The graphics processing unit 12041 performs processing on image data of a static picture or a video that is obtained by an image acquisition device (for example, a camera) in a video acquisition mode or an image acquisition mode. An image frame that has been processed may be displayed on a display unit 1206. The image frame that has been processed by the graphics processing unit 12041 may be stored in the memory 1209 (or another storage medium) or sent by using the radio frequency unit 1201 or the network module 1202. The microphone 12042 may receive sound and be able to process such sound as audio data. The processed audio data may be converted, in a phone talk mode, into a format that may be sent to a mobile communication base station via the radio frequency unit 1201 for output.

The electronic device 1200 further includes at least one sensor 1205 such as an optical sensor, a motion sensor, and other sensors. Specifically, the optical sensor includes an ambient light sensor and a proximity sensor. The ambient light sensor may adjust luminance of the display panel 12061 according to the luminance of the ambient light, and the proximity sensor may switch off the display panel 12061 and/or backlight when the electronic device 1200 is moved to the ear. As one type of motion sensor, an acceleration sensor may detect magnitude of accelerations in various directions (generally on three axes), may detect magnitude and a direction of the gravity when static, and may be configured to recognize the attitude of the electronic device (for example, switching between landscape orientation and portrait orientation, a related game, and magnetometer attitude calibration), a function related to vibration recognition (such as a pedometer and a knock), and the like. The sensor 1205 may further include a fingerprint sensor, a pressure sensor, an iris sensor, a molecular sensor, a gyroscope, a barometer, a hygrometer, a thermometer, an infrared sensor, and the like, which is not detailed herein.

The display unit 1206 is configured to display information input by the user or information provided for the user. The display unit 1206 may include a display panel 12061. The display panel 12061 may be configured in the form of a liquid crystal display (LCD), an organic light-emitting diode (OLED), or the like.

The user input unit 1207 may be configured to receive input digit or character information, and generate key signal input related to the user setting and function control of the electronic device. Specifically, the user input unit 1207 includes a touch panel 12071 and other input devices 12072. The touch panel 12071, also called a touchscreen, may collect a touch operation by a user on or near the touch panel (such as an operation of a user on or near the touch panel 12071 by using any suitable object or attachment, such as a finger or a touch pen). The touch panel 12071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then transmits the contact coordinate to the processor 1210, and receives and executes a command transmitted by the processor 1210. In addition, the touch panel 12071 may be implemented by using various types, such as a resistive type, a capacitance type, an infrared type, and a surface acoustic wave type. In addition to the touch panel 12071, the user input unit 1207 may further include other input devices 12072. Specifically, other input devices 12072 may include, but are not limited to, a physical keyboard, a functional key (such as a volume control key or a switch key), a track ball, a mouse, and a joystick, which are not described herein in detail.

Further, the touch panel 12071 may cover the display panel 12061. After detecting a touch operation on or near the touch panel, the touch panel 12071 transfers the touch operation to the processor 1210, to determine a type of a touch event. Then, the processor 1210 provides a corresponding visual output on the display panel 12061 according to the type of the touch event. Although, in FIG. 4, the touch panel 12071 and the display panel 12061 are used as two separate components to implement input and output functions of the electronic device, in some embodiments, the touch panel 12071 and the display panel 12061 may be integrated to implement the input and output functions of the electronic device, which are not limited herein.

The interface unit 1208 is an interface for connecting an external apparatus to the electronic device 1200. For example, the external apparatus may include a wired or wireless headset port, an external power supply (or battery charger) port, a wired or wireless data port, a storage card port, a port configured to connect an apparatus having an identification module, an audio input/output (I/O) port, a video I/O port, an earphone port, and the like. The interface unit 1208 may be configured to receive an input (such as data information or electric power) from an external apparatus and transmit the received input to one or more elements in the electronic device 1200 or may be configured to transmit data between the electronic device 1200 and an external apparatus.

The memory 1209 may be configured to store software programs and various pieces of data. The memory 1209 may mainly include a program storage area and a data storage area. The program storage area may store an operating system, an application program required by at least one function (for example, a sound playback function and an image display function), and the like. The data storage area may store data (for example, audio data and a phone book) created according to use of the electronic device. In addition, the memory 1209 may include a high-speed random access memory, and may further include a nonvolatile memory, such as at least one magnetic disk storage device, a flash memory, or another volatile solid-state storage device.

A processor 1210 is the control center of the electronic device, and is connected to various parts of the electronic device by using various interfaces and lines. By running or executing the software program and/or module stored in the memory 1209, and invoking data stored in the memory 1209, the processor 1210 performs various functions and data processing of the electronic device, thereby performing overall monitoring on the electronic device. The processor 1210 may include one or more processing units. Optionally, the processor 1210 may integrate an application processor and a modem processor. The application processor mainly processes an operating system, a user interface, an application program, and the like. The modem processor mainly processes wireless communication. It may be understood that the modulation and demodulation processor may not be integrated into the processor 1210.

The electronic device 1200 further includes a power supply 1211 (such as a battery) for supplying power to the components. Optionally, the power supply 1211 may be logically connected to the processor 1210 by using a power management system, thereby implementing functions such as charging, discharging, and power consumption management by using the power management system.

In addition, the electronic device 1200 includes a number of functional modules that are not shown, and details are not described herein again.

Optionally, the embodiments of the present disclosure further provide a terminal device, including a processor 1210, a memory 1209, and a computer program or instructions on the memory 1209 and executed on the processor 1210, where when executed by the processor 1210, the computer program or the instructions implements the processes of any of the foregoing method embodiments, and can achieve the same technical effects, which is not detailed herein.

The embodiments of the present disclosure further provide a readable storage medium, storing a computer program or instructions, the computer program or the instructions, when executed by the processor 1210, implementing the processes of any of the foregoing method embodiments, and can achieve the same technical effects, which is not detailed herein. The readable storage medium is, for example, a read-only memory (ROM), a random access memory (RAM), a magnetic disk, an optical disc, or the like.

The embodiments of the present disclosure further provide a computer program product, stored in a non-volatile storage medium and configured to be executed by at least one processor to implement the steps of the control method according to the foregoing embodiments.

The embodiments of the present disclosure further provide a chip, including a processor and a communication interface. The communication interface is coupled to the processor, and the processor is configured to run a program or instructions to implement the control method according to the foregoing embodiments.

It should be noted that, the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the method and apparatus in the embodiments of the present disclosure is not limited to performing functions in the order shown or discussed, and may include performing functions in a substantially simultaneous manner or in a reverse order according to the functions involved. For example, the method may be performed in an order different from the described order, and various steps may be added, omitted, or combined. In addition, features described in some embodiments may be combined in other embodiments.

According to the description in the foregoing embodiments, a person skilled in the art may clearly learn that the method according to the foregoing embodiments may be implemented by relying on software and a commodity hardware platform or by using hardware. Based on such an understanding, the technical solutions of the present application essentially, or the part contributing to the prior art, may be presented in the form of a software product. The computer software product is stored in a storage medium (for example, a ROM/RAM, a magnetic disk, or an optical disc) including several instructions to enable an electronic device (which may be a mobile phone, a computer, a server, a network device, or the like) to perform the methods described in the embodiments of the present disclosure.

The differences between the embodiments are highlighted in the foregoing embodiments of the present disclosure. Different optimization characteristics among the embodiments can be combined to form better embodiments as long as they are not contradictory, which is not detailed herein.

The foregoing descriptions are merely embodiments of the present disclosure and are not intended to limit the present disclosure. For a person skilled in the art, various modifications and variations can be made to the present disclosure. Any modification, equivalent replacement, or improvement made without departing from the spirit and principle of the present disclosure shall fall within the scope of the claims of the present disclosure.

What is claimed is:

1. An electronic device, comprising a housing, a display screen, a deformation drive part, and a camera module, wherein:
   the display screen is disposed on the housing, the display screen and the housing form an inner cavity, the camera module and the deformation drive part are disposed in the inner cavity, the display screen comprises a first area and a second area connected to each other, the first area is a first plane area, the second area is located on an edge of the display screen, the deformation drive part is connected to the second area, the deformation drive part drives the second area to switch between a flattened state and a curved state through deformation; in a case that the second area is in the flattened state, the second area is a flat second plane area, and the second plane area is located in a same plane as the first plane area; in a case that the second area is in the curved state, the second area is curved; a light-transmitting area is disposed in the second area; and in the case that the second area is in the flattened state, ambient light passing through the light-transmitting area is projected onto the camera module.

2. The electronic device according to claim 1, wherein the orientation of the light-transmitting area intersects with the orientation of the camera module, a reflection component is disposed between the light-transmitting area and the camera module, and the ambient light passing through the light-transmitting area is reflected to the camera module by the reflection component.

3. The electronic device according to claim 2, wherein the reflection component is connected to the deformation drive part, the deformation drive part drives the reflection component to move to a working position, and the ambient light passing through the light-transmitting area is reflected to the camera module by the reflection component at the working position.

4. The electronic device according to claim 2, wherein the reflection component is rotatably disposed on an inner side of the second area, the electronic device further comprises a drive apparatus, the drive apparatus is connected to the reflection component, and the drive apparatus drives the reflection component to rotate, so that an incident surface of light of the reflection component corresponds to the second area in the flattened state.

5. The electronic device according to claim 2, wherein the reflection component is rotatably disposed on an inner side of the second area, the electronic device further comprises a drive mechanism, the drive mechanism is disposed on a side of the camera module facing away from the reflection component, and the drive mechanism drives the camera module to push the reflection component to rotate, so that an incident surface of light of the reflection component is closely attached to the inner side of the second area in the flattened state.

6. The electronic device according to claim 5, wherein the reflection component is a triangular prism, a right-angle part of the triangular prism is rotatably connected to the second area or the deformation drive part; and in the flattened state, a first right-angle surface of the triangular prism faces the second area, and a second right-angle surface of the triangular prism faces the camera module.

7. The electronic device according to claim 5, wherein in the flattened state, an inner surface of the first area is parallel to the first plane area, and the camera module is slidably disposed on the inner surface of the first area.

8. A control method of an electronic device, applied to the electronic device according to claim 5, and the control method comprising:
   receiving an input;
   in a case that the input is a first input, controlling the deformation drive part to drive the second area to be in the flattened state, and controlling the camera module to shoot; and
   in a case that the input is a second input, controlling the deformation drive part to drive the second area to be in the curved state.

9. A control method of an electronic device, applied to the electronic device according to claim 2, and the control method comprising:
   receiving an input;
   in a case that the input is a first input, controlling the deformation drive part to drive the second area to be in the flattened state, and controlling the camera module to shoot; and
   in a case that the input is a second input, controlling the deformation drive part to drive the second area to be in the curved state.

10. The electronic device according to claim 1, further comprising a folding mechanism, wherein the folding mechanism is connected in a sealed manner between the second area and the housing; the folding mechanism is in an unfolded state in the case that the second area is in the flattened state; and the folding mechanism is in a folded state in the case that the second area is in the curved state.

11. A control method of an electronic device, applied to the electronic device according to claim 10, and the control method comprising:
    receiving an input;
    in a case that the input is a first input, controlling the deformation drive part to drive the second area to be in the flattened state, and controlling the camera module to shoot; and
    in a case that the input is a second input, controlling the deformation drive part to drive the second area to be in the curved state.

12. The electronic device according to claim 1, further comprising an elastic connection mechanism, wherein the elastic connection mechanism is connected in a sealed manner between the second area and the housing; the elastic connection mechanism is in an extended state in the case that the second area is in the flattened state; and the elastic connection mechanism is in a retracted state in the case that the second area is in the curved state.

13. A control method of an electronic device, applied to the electronic device according to claim 12, and the control method comprising:
receiving an input;
in a case that the input is a first input, controlling the deformation drive part to drive the second area to be in the flattened state, and controlling the camera module to shoot; and
in a case that the input is a second input, controlling the deformation drive part to drive the second area to be in the curved state.

14. The electronic device according to claim 1, wherein the housing comprises a back cover, the back cover comprises a flat part and a curved part, the curved part is jointed with the flat part, and in the case that the second area is in the curved state, the curved part is jointed with the second area, and tangents at a joint between the curved part and the second area are collinear.

15. A control method of an electronic device, applied to the electronic device according to claim 14, and the control method comprising:
receiving an input;
in a case that the input is a first input, controlling the deformation drive part to drive the second area to be in the flattened state, and controlling the camera module to shoot; and
in a case that the input is a second input, controlling the deformation drive part to drive the second area to be in the curved state.

16. The electronic device according to claim 1, wherein the first area and the second area are display areas, and a transmittance of the second area is greater than a transmittance of the first area.

17. A control method of an electronic device, applied to the electronic device according to claim 16, and the control method comprising:
receiving an input;
in a case that the input is a first input, controlling the deformation drive part to drive the second area to be in the flattened state, and controlling the camera module to shoot; and
in a case that the input is a second input, controlling the deformation drive part to drive the second area to be in the curved state.

18. A control method of an electronic device, applied to the electronic device according to claim 1, and the control method comprising:
receiving an input;
in a case that the input is a first input, controlling the deformation drive part to drive the second area to be in the flattened state, and controlling the camera module to shoot; and
in a case that the input is a second input, controlling the deformation drive part to drive the second area to be in the curved state.

19. A terminal device, comprising a processor, a memory, and instructions stored in the memory and runnable on the processor, the instructions, when being executed by the processor, implementing the operations of the control method according to claim 18.

20. A non-transitory readable storage medium, storing instructions, the instructions, when being executed by a processor, implementing the operations of the control method according to claim 18.

* * * * *